3,146,156
PRODUCTION OF SAG-RESISTANT MINERAL
FIBERBOARD
John E. Cadotte, Cloquet, Minn., assignor to Wood Conversion Company, St. Paul, Minn., a corporation of Delaware
No Drawing. Filed Oct. 21, 1960, Ser. No. 63,960
6 Claims. (Cl. 162—135)

The present invention relates to starch-bonded mineral fiberboard, and in particular, to minimizing the tendency of edge-mounted panels thereof to sag when exposed to a humid atmosphere.

Felted mineral fiberboards of one kind comprise a predominant content of individual mineral fibers bonded fiber to fiber by some form of starch which is essentially a dried residue of an aqueous colloidal form of the starch, such as gelatinized starch. One way so to bind the fibers is to include gelatinized or pasted starch in an aqueous slurry of fibers from which a wet mat is formed by felting, as in a Fourdrinier machine, for drying to a board. Another way is to include starch grains, or flour containing starch grains, in such a wet mat, and to gelatinize the starch in the wet mat by heating the mat throughout at a gelatinizing temperature before drying the mat to produce a board. Also, it is known to include both gelatinized starch and starch grains in the wet mat and to process the mat and starch grains as stated above. Still another method is to mix the mineral fibers into a starch paste as a thick composition which is placed in a molding tray and dried.

It is a conventional practice horizontally to mount panels of such starch-bonded mineral fiberboards in relatively large sizes, such as 2 x 4 feet, in ceilings, by supporting only the edges of a panel. It has been experienced that in a humid atmosphere, for example, upwardly from about 90% relative humidity, such mounted panel has a tendency to sag.

The sag is attributed to the hydrophilic character of the starch binder and its absorption of moisture vapor, in the manner well-known to wearers of starched clothing in hot, humid summer days. Mineral fibers in a mineral fiberboard are impregnable solids, and the starch binder is present as thin films or bodies over fibers and at fiber junctions. The rigidity of such starch films and bodies is lessened as they absorb water from moisture in the atmosphere, and further lessened as the temperature is increased.

It is an object of the present invention to minimize such tendency to sag.

Studies of sagging have led to two types of processing to minimize the tendency to sag. One is an external treatment involving a coating on a face of the tile. The other, which is the subject of the present invention, is an internal treatment. Each method may be made effective when used alone, and both methods may be effectively combined, thus permitting in such a combination a lessening of the extent to which each method is practiced when used alone for the same end result.

Starch-bonded mineral fiberboards vary greatly in composition. Essentially, the mineral fibers are positioned relative to each other by the dried starch, the rigidity of which makes a stable board. The plasticizing of starch bonds by absorbing moisture leads to slight instability, which is evidenced in sag where the weight of mounted tile is active to induce sag.

The present invention is based upon the discovery that by including in the aqueous furnish containing the mineral fibers and starch, certain magnesium compounds selected from the group consisting of magnesium oxide, magnesium hydroxide, magnesium carbonate and basic magnesium carbonate, the resulting dried board has a greatly lessened tendency to sag than when the same composition is used without the magnesium compound. The effect increases with increased amounts of the additive up to about 10 parts calculated as MgO per 100 parts of fiber in the dry board. It is believed, without factual knowledge, that there is some relationship between the magnesium compound and the starch binder which renders the starch less affected by high humidity.

The presence of cellulosic fibers in the board does not negative the desired result, as shown by the following example of a composition for board responsive to the present invention.

Table I

| | Parts by weight |
|---|---|
| Slag wool fiber | 94.5 |
| Amosite fiber | 2.5 |
| Sulfite cellulose fiber | 3.0 |
| Tapioca starch grains | 13.0 |
| Solids of aqueous wax-size [1] | 1.0 |

[1] As disclosed in Olson U.S. No. 2,754,206.

A slurry containing the above materials is felted on a Fourdrinier machine and pressed to a mat. The pressed wet mat is heated to gelatinize the starch, and then dried. The pressing is such as to form a dry board of 12 to 30, and preferably 18 to 20, pounds density per cu. ft., and the original felt being suitably thick to form a tile board of approximately 0.560 inch thick at said 18 to 20 pounds density.

A comparative standardized test was devised to measure sag. Samples of the board 3 x 8 inches were cut and the two ends supported on ½-inch steel bars, with a sand bag weighing three times the weight of the board placed as a center load, over a lengthwise extent of about 3 inches. Pieces to be compared were subjected side by side to two separated 24-hour periods of 90 to 97% relative humidity.

Sample A corresponds to the composition of Table I with inclusion of 4 parts of calcined magnesite, which converts in water to magnesium hydroxide. Sample B uses instead 4 parts of magnesium carbonate. Because of variations in humidity from test to test, each test piece and a control are used side by side, the controls responding differently from test to test because of variations of humidity in successive tests. Table II shows the deflections as sag in inches.

Table II

| | Sag in inches |
|---|---|
| Sample A | 0.031 |
| Its control | 0.142 |
| Sample B | 0.020 |
| Its control | 0.099 |

Among the external treatments referred to for minimizing sag is the application to the back of the tile of a coat of moisture-resistant thermosetting resin, and setting the resin. Such a coat of a resin formed from one mole of melamine and 3 moles of formaldehyde at a usage of 8.7 lbs. per M sq. ft., on the back of a tile containing the magnesium compound added greatly to its sag resistance as shown in Table III, wherein Sample C corresponds to Sample A, and wherein Sample D is Sample C coated with said resin.

The tests reported in Table III were conducted simultaneously on five panels 2 x 4 feet in size. The samples were suspended from their edges at near the top within a polyethylene tent, with a generator for water vapor opening into the side of the tent to create humidity. Because of the larger size of the test pieces for Table III, the sag is greater than reported in Table II for the smaller sized samples. The tests reported in Tables IV and V below were conducted in the manner described for Table II.

*Table III*

| | Sag in inches |
|---|---|
| Control | 1.154 |
| Sample C | 0.432 |
| Sample D | 0.076 |
| Sample D | 0.088 |
| Sample D | 0.239 |

The external coating is not limited to melamine-formaldehyde. Other rigidifying moisture-resistant thermoset resins may be used as set forth in my copending application Serial No. 60,211, filed October 3, 1960. Therein, powdered phenol-formaldehyde thermosetting resin is described as effective when sprinkled over a face of the board. Also, urea-formaldehyde resins may be used, as well as numerous commercial resins of composition unknown by the public, which form moisture-resistant thermoset resins. Such resins may be distended by including particles of clay for example.

Board compositions in which the magnesium compounds have been effective as described fall within the following ranges of ingredients shown in Table IV, excepting the magnesium compound.

*Table IV*

| | Parts by weight | Parts by weight | Parts by weight |
|---|---|---|---|
| Feltable fibers | | | 77 to 100 |
| Mineral fibers | | 77 to 90 | |
| Synthetic | 75–88 | | |
| Asbestos | 2–15 | | |
| Cellulosic fibers | | 0 to 10 | |
| Starch | | | 5 to 20 |

Other compositions may be used, but those given in Table IV are preferred since they provide fire-resistant tile.

In a series of compositions having the formulation of Table I, various amounts of magnesium compound were included and tested for sag against a control, as reported in Table V.

*Table V*

| Parts Mg compound per 100 of fiber | Mg compound | Sag in inches |
|---|---|---|
| 0 | MgCO₃ | .200 |
| 1 | MgCO₃ | .125 |
| 3 | MgCO₃ | .047 |
| 5 | MgCO₃ | .025 |
| 7 | MgCO₃ | .024 |
| 10 | MgCO₃ | .016 |
| 0 | MgO | .180 |
| 2 | MgO | .044 |
| 4 | MgO | .040 |
| 5 | MgO | .037 |
| 6 | MgO | .038 |
| 8 | MgO | .033 |

Some mineral fiberboards are formed batchwise by drying a thick mixture of pasted starch and mineral fibers in a tray. By including the magnesium compound in the composition the tendency to sag is greatly reduced. Table VI shows such a composition with and without the magnesium compound and the respective amounts of sag when tested as described.

*Table VI*

Part I:
| | | |
|---|---|---|
| Slag wool fiber | parts | 100 |
| Pasted tapioca starch | do | 15 |
| Water | do | 400 |
| Sag | inches | 0.217 |

Part II:
| | | |
|---|---|---|
| Part I plus magnesium oxide | parts | 10 |
| Sag | inches | 0.031 |

It is not known why the magnesium compound functions as described, but it is possible that it enters into some physical or chemical combination with the starch. Accordingly, there is no assurance that the ingredient selected to provide the magnesium compound remains as such in the final board. The accompanying claims set forth the invention in terms directed to selection of the ingredient for producing the product.

I claim:

1. The method which comprises incorporating material selected from the group consisting of magnesium oxide, magnesium carbonate, magnesium hydroxide and basic magnesium carbonate into an aqueous mass aside from the water consisting substantially entirely of mineral fibers in quantity to form a mineral fiberboard and starch for binder, said aqueous mass containing fibers consisting by weight of from 77 to 100 parts of feltable fibers of which 77 to 90 parts are mineral fibers including from 75 to 88 parts of synthetic mineral fibers, and drying said mass in which said starch is present in gelatinized form, said selected material in amount in the range from 1 to 10 parts calculated as MgO per 100 parts of fiber being effective to minimize the tendency of a tile of such board to sag at high humidity when mounted at opposite edges thereof.

2. Mineral fiberboard consisting substantially entirely of fibers consisting by weight of from 77 to 100 parts of feltable fibers of which 77 to 90 parts are mineral fibers including from 75 to 88 parts of synthetic mineral fibers, dried gelatinized starch as binder therefor, and material provided as an ingredient selected from the group consisting of magnesium oxide, magnesium carbonate, magnesium hydroxide and basic magnesium carbonate, said material when present in amount in the range from 1 to 10 parts calculated as MgO per 100 parts of fiber being effective to minimize sag of tile thereof under conditions of high humidity.

3. Mineral fiberboard comprising fibers consisting of mineral fibers, and further comprising dried gelatinized starch as binder therefor, and anti-sag material provided as an ingredient selected from the group consisting of magnesium oxide, magnesium carbonate, magnesium hydroxide and basic magnesium carbonate, said selected material being present in amount in the range from 1 to 10 parts calculated as MgO per 100 parts of fiber.

4. Mineral fiberboard consisting substantially entirely of fibers, dried gelatinized starch as binder and magnesium compound, said fibers consisting by weight of from 77 to 100 parts of feltable fibers of which 77 to 90 parts are mineral fibers including from 75 to 88 parts of synthetic mineral fibers, and said compound being provided as an ingredient selected from the group consisting of magnesium oxide, magnesium carbonate, magnesium hydroxide and basic magnesium carbonate, said selected material being present in amount in the range from 1 to 10 parts calculated as MgO per 100 parts of fiber.

5. Mineral fiberboard consisting substantially entirely of fibers, dried gelatinized starch as binder and magnesium compound, said fibers consisting by weight of from 77 to 100 parts of feltable fibers of which 77 to 90 parts are mineral fibers including from 75 to 88 parts of synthetic mineral fibers, and said magnesium compound being present in quantity from 1 to 10 parts by weight calculated as MgO per 100 parts of fiber and being provided as an ingredient selected from the group consisting of magnesium oxide, magnesium carbonate, magnesium hydroxide and basic magnesium carbonate.

6. Mineral fiberboard tile comprising fibers consisting by weight of from 77 to 100 parts of feltable fibers of which 77 to 90 parts of mineral fibers including from 75 to 88 parts of synthetic mineral fibers, dried gelatinized starch binder for said fibers, and from 1 to 10 parts by weight of magnesium compound calculated as MgO per 100 parts of fibers, said compound being provided as an ingredient selected from the group consisting of magnesium oxide, magnesium carbonate, magnesium hydroxide and basic magnesium carbonate, at least one face of said tile having at least the outermost fibers thereof and the starch bonds thereof coated with thermoset moisture-resistant resin forming a continuous surface layer over substantially the entire area of said face.

References Cited in the file of this patent

UNITED STATES PATENTS

| | | |
|---|---|---|
| 1,831,928 | Rafton | Nov. 17, 1931 |
| 1,839,135 | Vivas | Dec. 29, 1931 |
| 2,614,945 | Krisan | Oct. 21, 1952 |
| 2,633,433 | Hollenberg | Mar. 31, 1953 |
| 2,772,603 | Waggoner | Dec. 4, 1956 |
| 2,773,764 | Park | Dec. 11, 1956 |
| 2,829,987 | Bus | Apr. 8, 1958 |
| 2,900,335 | Bravos | Aug. 18, 1959 |